F. N. CONNET.
METER FOR LIQUIDS AND GASES.
APPLICATION FILED SEPT. 23, 1907.
934,504.
Patented Sept. 21, 1909.
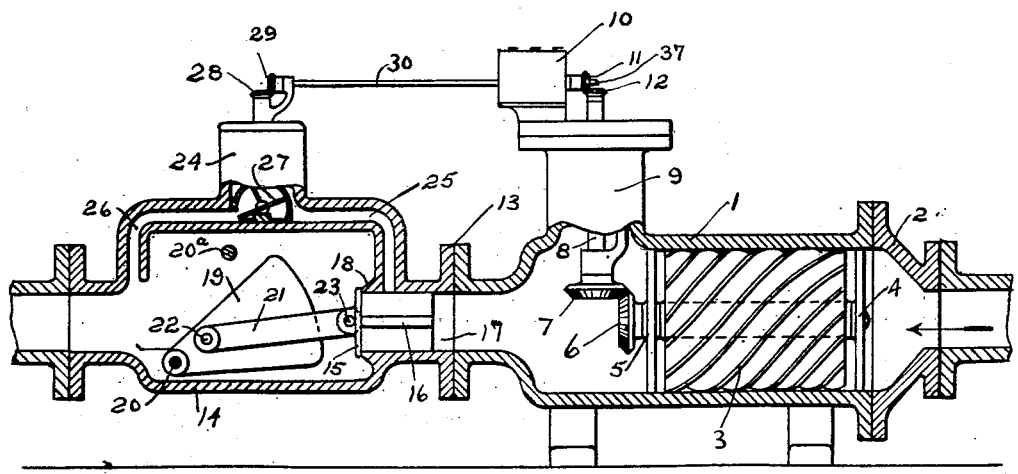
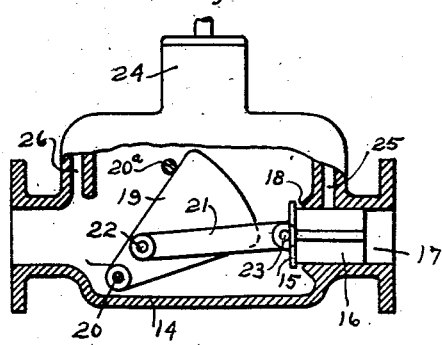
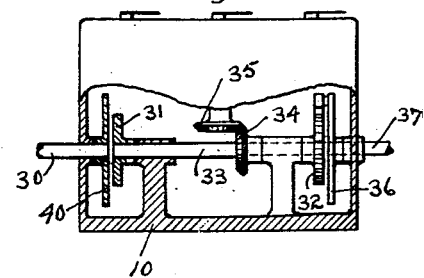
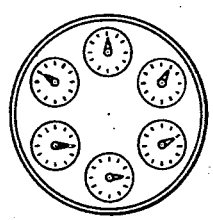
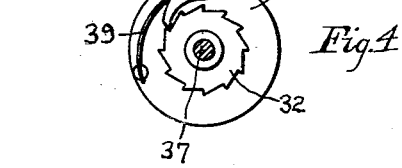
Witnesses
John F. Cavanagh
E. D. Ogden
Inventor
Frederick N. Connet
By
Howard E. Barlow
Attorney

UNITED STATES PATENT OFFICE.

FREDERICK N. CONNET, OF PROVIDENCE, RHODE ISLAND.

METER FOR LIQUIDS AND GASES.

934,504.  Specification of Letters Patent.  Patented Sept. 21, 1909.

Application filed September 23, 1907. Serial No. 394,032.

*To all whom it may concern:*

Be it known that I, FREDERICK N. CONNET, a citizen of the United States, residing at the city of Providence, in the county of Providence and State of Rhode Island, have invented certain new and useful Improvements in Meters for Liquids and Gases, of which the following is a specification, reference being had therein to the accompanying drawing.

This invention relates to meters for measuring liquids and gases, and has for its object to provide a simple and effective meter constructed of a plurality of measuring devices of different capacities so arranged that some one of said devices will be actuated by the flow to accurately measure and show the quantity passing through whereby a great range in the rate of flow through the pipe will be accurately measured.

A further object of the invention is to provide a single device which will count, indicate or record, to accurately show in gallons, cubic feet or other desired units of measure the amount which passes through the pipe, to which device all of the measuring devices are connected, whereby the measurer traveling the fastest will be the only one to actuate the indicator.

It is found in practice that meters designed for the delivery of large quantities of water are not sensitive enough and cannot be depended upon to accurately measure small quantities passing therethrough, and I have therefore arranged an auxiliary or measuring device of a less capacity to work in conjunction with the larger measuring device, both of said devices being connected to an indicator in such a manner that only one can act upon it at a time.

A further object of the invention is to provide an automatically actuated direction controlling valve whereby the flow up to a predetermined amount after passing through the large measuring device will be obliged to pass through the smaller one where it is accurately measured, but when the flow is sufficient to operate the larger device at a speed necessary to register accurately, then said valve will automatically open and allow the whole to pass straight through the main without passing around through the smaller measures. When the flow again falls off a predetermined amount this valve will close automatically and send the flow through the small measurer again.

An essential feature of the device is that a pair of ratchet wheels is arranged whereby the measurer traveling the faster is the only one that can operate the counting mechanism.

A further object of the invention is to provide an automatically actuated check valve which will, on account of the angle of thrust of its connecting links on its balancing weight, remain closed until the pressure has risen to an amount sufficient to open the same, after which it will remain open until said pressure has been reduced considerably below the amount required to open it. Thus the valve is effectually prevented from continually opening and closing, as is the case with the ordinary check valve, to change the course of the water from passing straight through the large measurer and then through the small.

With these and other objects in view, the invention consists of certain novel features of construction, as will be more fully described and particularly pointed out in the appended claims.

In the accompanying drawings: Figure 1—is a side elevation partially in section showing the combined use of both the large and small measuring device, each to act independently upon a single counting or registering device, all being connected to the main supply pipe. Fig. 2—is a sectional view showing the weighted check valve in the open position. Fig. 3—is a view partially in section showing two ratchet wheels one of which is in section connected to the winding device arranged to be operated independently by either of the two measuring devices. Fig. 4—is a face view of the ratchet wheel and pawl. Fig. 5—is a face view of the counting device.

The essential feature of my device is the combination of two meters or measuring devices, one large and one small, both arranged to operate independently upon a single counting device. Meters, or measuring devices, of any suitable construction may be employed for this purpose, but for convenience I have shown a large measuring device of the screw propeller type, and a small measuring device of the balance disk type. The larger one, as shown in Fig. 1, is constructed of a casing 1 onto which a hood 2 at one end is secured. Mounted in this casing is the screw propeller 3 journaled in the bearings 4 and 5 at either end. The propeller may be of any desired construction and of any suitable material. On the inner end of the propeller shaft is fixed the beveled gear 6 which meshes with a similar gear at 7, the latter being mounted on the upright shaft 8 which extends up through suitable gearing (not shown) located in the casing 9, through which to operate the counting device 10 at the proper speed through the miter gears 11 and 12 to indicate or show the amount of flow through the measuring propeller.

The propeller casing 1 may be connected at 13 to the casing 14 on the check valve. The controlling valve comprises a plate 15 guided by cross wings 16 in the inlet opening 17 whereby this inlet may be closed or opened by moving the valve to or from its seat 18.

At 19 is the valve balancing weight pivoted at 20 in the casing. A connecting link 21 is pivoted at 22 in this weight its opposite end being pivoted at 23 to the valve plate 15 forming a toggle joint in such a manner that the weight holds the valve in its closed position, the angle of thrust being so arranged as to require a considerable pressure against the valve to raise the weight and open the same, but as soon as the pressure has increased a predetermined amount the said weight 19 is raised into the position illustrated in Fig. 2 against the stop pin 20ª, allowing the valve to open a sufficient amount to admit the full volume of water to pass therethrough. In this position it will be noted that the angle of thrust is considerably changed whereby the weight will be retained in its open position by a much less pressure than was required to raise it into that position, thus effectually preventing the valve from opening and closing by a slight variation in pressure, which is bound to be the case in the ordinary check valve.

The smaller measuring device 24, partially in section, shows another style or disk operated measuring device which is designed to measure small quantities of water more accurately. This may be placed in any desired position and connected to the check valve by passages or in any other convenient way, whereby when the check valve is closed the water will pass through this small or auxiliary measuring device, but for convenience I have shown this small device mounted on the check valve casing 14 with passageways 25 and 26 formed in the walls of the valve casing for conducting the water through the measurer from one side to the other of the valve, in the passage of which the disk 27 is actuated to move a train of gears, or other mechanism, not shown, in the casing 24, to operate the counting device 10 through the miter gears 28 and 29 and the shaft 30 to accurately register, or otherwise show, the rate of flow through said pipe.

When the water is passing through the small measurer it of course also passes through the larger one, which latter may or may not rotate, and in order that the counting device shall be operated only by the one which registers the most I have connected both to said device in such a manner that the one turning the faster shall do the registering. To accomplish this two ratchet wheels 31 and 32 are each mounted on and fixed to shaft 33 in the counter casing 10, as illustrated in Fig. 3, which shaft is connected through the gears 34 and 35 to suitable mechanism not shown to operate the several pointers to indicate or show the rate of flow. A pawl disk 36 is mounted on the shaft 37 to communicate with the large meter. On this disk is mounted the pawl 38 pressed by the spring 39 against the ratchet wheel 32. A similar disk 40 carrying a pawl is mounted on the shaft 30 which leads from the small meter, said pawl being adapted to engage and operate the ratchet wheel 31, in the manner illustrated in Fig. 4. By this arrangement it will be seen to be impossible for the counter to be driven by but one meter at a time unless both shaft 30 and 37 happened to rotate at the same velocity, therefore the record of but one meter can be made and that of the one that turns the faster.

A simple and effective device of this character adapted to accurately register a great range of flow is extremely useful for a great variety of purposes, among others being the use in a water supplying system for fire protection where ordinarily but a small quantity is being drawn through the pipe and accurately registered, but in case of fire the main valve will be automatically opened and a large quantity may be drawn through the same pipe, which will also be properly registered.

I do not confine myself to the use of but two measuring devices as any number of these devices may be used all being connected to a common registering device without departing from the spirit and scope of my invention, neither do I confine myself to the operation of a counter or register operated by these said measuring devices, as any kind of a registering indicating or recording device may be used for showing the amount of liquids or gases which passes through the main.

Having thus described my invention, what I claim as new and desire to secure by Letters Patent, is:

1. A meter comprising a plurality of fluid measuring devices of different capacities, a single registering device, and means for operating said registering device by either of said measuring devices whereby said registering device is controlled by that one of said measuring devices having the greater speed.

2. A meter comprising a single registering device, a plurality of measuring devices of different capacities, and means connecting said measuring and registering devices, whereby but one measuring device, which is that having the greatest speed, will be caused to operate the registering device to measure the rate of flow.

3. A meter comprising a plurality of fluid measuring devices of different capacities, a single registering device, means for operatively connecting all of said measuring devices to said registering device, whereby but one of said devices, which is that having the greater speed, will be caused to operate the registering device to measure the rate of flow and means for automatically controlling the flow through the smaller measuring device.

4. A meter comprising a single registering device, a plurality of measuring devices adapted to run at different relative speeds under different conditions, means connecting said measuring and registering devices whereby said registering device can be operated by but one of said measuring devices at a time, which is that having the greatest speed, said meter being provided with passageways communicating with the different measuring devices, and means for automatically controlling the flow through said passageways whereby either one or the other of said measuring devices is caused to actuate said registering device.

5. A meter comprising a single fluid registering device, a large measuring device, a smaller measuring device, means connecting the measuring and registering devices whereby said registering device can be operated by but one of said measuring devices at a time, which is that having the greater speed, said meter being provided with passageways communicating with the different measuring devices, and a valve for automatically controlling the flow through said passageways whereby all of the liquid up to a predetermined quantity is caused to pass through both the larger and the smaller measuring device, running the smaller at a greater speed and when in excess of said quantity the flow will change and cause the larger measuring device to run at the greater speed and operate the registering device.

6. A meter comprising a single device for registering the amount of fluid which passes therethrough, a large measuring device and a smaller measuring device, means for operatively connecting said measuring and registering devices, whereby said registering device can be operated only by the measuring device that runs the faster.

7. A meter comprising a single registering device a large measuring device and a smaller measuring device each adapted under different conditions to run at different relative speeds, means connecting said measuring and registering devices, whereby said registering device can only be operated by the measuring device that runs the faster, said meter being provided with passageways communicating with the different measuring devices, and a valve for automatically controlling the flow through said passageways.

8. A meter for measuring fluids comprising measuring devices of different capacities, a single device for registering the amount which passes through the meters, means for connecting all of said measuring devices to said registering device, whereby but one can effectively operate said registering device at a time, means for causing the flow up to a predetermined amount to pass through and operate the smaller measuring device at the greater speed and when in excess of said amount said flow will change and cause the larger measuring device to run at the greater speed and operate the registering device.

9. A meter for measuring fluids comprising measuring devices of different capacities, a single registering device for showing the amount which passes through the meter, means for connecting all of said measuring devices to operate said registering device whereby but one can effectively operate said registering device at a time, means for causing the flow up to a predetermined amount to pass through both measuring devices and rotate the smaller one the faster, and when in excess of said amount to automatically change the flow and cause the larger measuring device to run the faster and operate the registering device, whereby said registering device is effectively actuated only by the measuring device that runs at a velocity sufficient to register the greater amount.

In testimony whereof I affix my signature in presence of two witnesses.

FREDERICK N. CONNET.

Witnesses:
HOWARD E. BARLOW,
WM. R. TILLINGHAST.